United States Patent Office 3,511,857
Patented May 12, 1970

3,511,857
ESTERS OF PHOSPHORUS AND METHOD OF PREPARATION THEREOF
Charles F. Baranauckas and Irving Gordon, Niagara Falls, N.Y., assignors to Hooker Chemical Corporation, Niagara Falls, N.Y., a corporation of New York
No Drawing. Filed Nov. 12, 1963, Ser. No. 323,114
Int. Cl. C07d 105/04; C07f 9/38
U.S. Cl. 260—347.8                    11 Claims This invention relates to novel organic phosphorus compounds. More particularly, it relates to novel esters of phosphonic acid that contain from two to about 32 hydroxyl groups, the 1,3,2-dioxaphosphorinane ring, to the processes for their preparation, and the novel esters of phosphorous acid utilized in the preparation of said esters of phosphonic acid.

In accordance with the present invention the novel esters of phosphonic acid have the structural formula

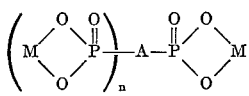

wherein M is the residue of a polyol wherein two hydroxyls are removed from a group of carbon atoms with hydroxyls attached thereto and one carbon atom between the two carbon atoms from which the hydroxyl groups have been removed, A is selected from the group consisting of an aliphatic and an aromatic radical, $n$ is selected from 0 to 5 and the molecule contains from 2 to about 32 hydroxyl groups.

The esters of phosphonic acid of the present invention may also be characterized as having from two to about thirty-two hydroxyl groups and at least one 1,3,2-dioxaphosphorinane ring with a structural formula of

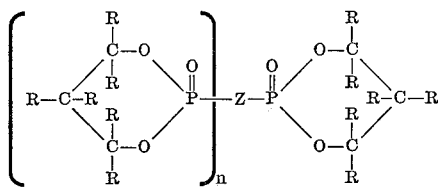

wherein R is selected from the group consisting of hydrogen, alkyl, alkyl substituted aryl, aryl substituted alkyl, nitro, chloromethyl, bromomethyl, iodomethyl, halogen substituted aryl, hydroxyalkyl, aryl, alkoxyalkyl, hydroxyalkoxyalkyl, alkene, alkyl substituted alkene, halogen substituted alkene, and mixtures thereof, Z is selected from the group consisting of alkyl, alkylene, alkene, aryl substituted alkyl, aryl, alkyl substituted aryl, halogen substituted aryl, heterocyclic, hydroxyl substituted alkyl, hydroxyl substituted alkylene, halogen substituted alkylene, hydroxyl substituted aryl, hydroxyaryl substituted alkyl, hydroxyalkyl substituted aryl, hydroxyalkyl substituted heterocyclic and mixtures thereof, and $n$ is from 0 to 5.

The novel esters of phosphonic acid containing the 1,3,2-dioxaphosphorinane ring and from two to about thirty-two free hydroxyl groups are particularly useful phosphorus containing chemicals and undergo many reactions with other polyfunctional intermediates. They react with polyisocyanates, e.g., toluene diisocyanate or polymethylene polyphenyl isocyanate to form foamed polyurethanes which are flame resistant and have improved heat distortion temperatures. In addition, the free hydroxyl groups in the 1,3,2-dioxaphosphorinane ring-containing phosphonates may be reacted with polybasic acids and anhydrides, e.g., isophthalic acid, fumaric acid, maleic anhydride, to form resinous polyester compositions that are flame resistant. The novel esters of phosphonic acids containing the 1,3,2-dioxaphosphorinane ring structural unit are resistant to hydrolytic attack significantly more than are phosphonates not containing the 1,3,2-dioxaphosphorinane ring structural unit. The novel esters of phosphonic acid of this invention are useful for reaction into alkyd resins that may be used to make film-forming products with improved resistance to burning. The novel esters of phosphonic acid containing the 1,3,2-dioxaphosphorinane ring structure and from two to thirty-two hydroxyl groups are particularly useful in polyolefins, e.g., polypropylene and polyethylene, to improve the dyeing characteristics of fibers produced, and these novel esters are not subject to loss by evaporation, hydrolysis or leaching.

The present novel esters may be prepared from a variety of known starting materials and through a variety of chemical transformations. In many instances the novel esters of the phosphonic acid are prepared from novel esters of phosphorous acid. In the instant invention these novel esters of phosphorous acid may be illustrated by the two general structural formulae:

(2)

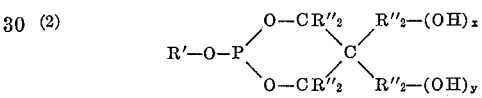

where R' is selected from the group consisting of alkyl, alkenyl and mixtures thereof, and R" is selected from the group consisting of hydrogen, alkyl, alkenyl, nitro, halomethyl, aryl substituted alkyl, alkoxyalkyl, and mixtures thereof and, the sum of $x$ and $y$ is from two to about twelve and (3)

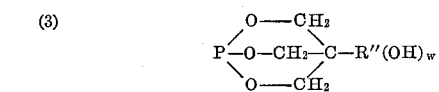

wherein R" is as defined above and $w$ is from two to eight. The novel esters of phosphorous acid disclosed in the description, in addition to being utilized as chemical intermediates, may be used as heat and light stabilizers for halogen containing vinyl and vinylidene resins. They also are useful as antioxidants, e.g., in natural rubber, synthetic rubber and so forth.

In accordance with this invention it has been found that novel esters of phosphonic acid having from two to about thirty-two hydroxy groups and containing at least one 1,3,2-dioxaphosphorinane ring may be prepared by reacting a phosphite having the structure of (2) or (3) (ring or bicyclic phosphite) with an organic halide having the general formula $ZX_m$, where Z is defined as above, X is a halogen selected from the group consisting of iodine, chlorine, and bromine and $m$ is from one to about 5.

In instances where the novel bicyclic phosphites of Formula 3 are used, a stoichiometric or approximately stoichiometric amount of the $ZX_m$ reactant is employed to open one of the rings in the bicyclic phosphite to form the 1,3,2-dioxaphosphorinane ring. The Z becomes attached directly to the phosphorus atom of the starting bicyclic phosphite, e.g., (4)

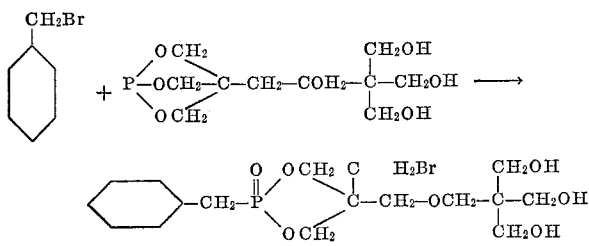

In instances where the novel cyclic phosphites as defined in (2) are used, an Arbuzov-type rearrangement of the phosphite to the phosphonate may be effected, using catalytic amounts of $ZX_m$, or heating, when the R' grouping in the phosphite is the same as Z in the $ZX_m$. In instances where the R' grouping in the phosphite is not the same as Z in the $ZX_m$, it is desirable to use at least stoichiometric quantities of the $ZX_m$ reagent.

The selection of the Arbuzov reagent to be used is determined by many factors, e.g., the structure of the phosphite that is to be reacted with, the availability of the number of equivalents of halogen in the Arbuzov reagent and so forth. It is preferred to utilize from 0.001 to about 10 moles of $ZX_m$ per mole of phosphite. However, better results are obtained when from 1 to about 5 moles of $ZX_m$ per mole of phosphite are utilized, with most favorable results being obtained when from 1 to 2 moles of $ZX_m$ per mole of phosphite are employed.

The cyclic phosphites of Formula 2 may be prepared by reacting a triorganic phosphite containing at least one aryl radical with a polyol having from 4 to about 14 hydroxyls, in a 1:1 molar ratio in the presence of a basic catalyst, while the bicyclic phosphite of Formula 3 may be prepared by reacting a polyol having from 4 to about 12 hydroxyls, with a triaryl phosphite in a 1:1 ratio in the presence of a basic catalyst. A trialkyl phosphite may also be utilized in preparing the cyclic phosphite of Formula 2, but if such a reactant is utilized the cyclic phosphite is mixed with a quantity of the bicyclic phosphite.

Although a 1:1 molar ratio of phosphite to polyol is preferred, this ratio may be varied and a ratio of 1 to 2 may be employed. When this ratio of polyol is employed phosphites having the formula

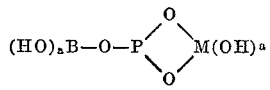

is formed, wherein B is the residue of the polyol with one hydroxyl removed and M is the residue of the polyol wherein two hydroxyls are removed from a group of carbon atoms with hydroxyls attached thereto and one carbon atom between two carbon atoms from which the hydroxyl groups have been removed, and the sum of (a) is selected from 2 to 32. Some phosphites which illustrate this feature of the invention are

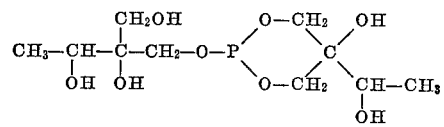

and

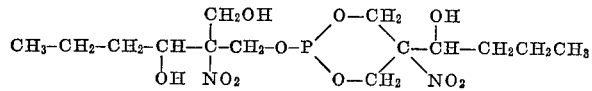

which are the reaction products of triphenyl phosphite and an excess of 2 - hydroxymethyl - butanetriol-1,2,3 and triphenyl phosphite with an excess of 2-nitro-2-hydroxy-methyl-hexandediol-1,3, respectively.

Examples of other phosphites which may be utilized to form the novel phosphite are diaryl monoalkyls and monoaryl dialkyls such as dicresyl butyl phospite, di(2,4-xylenyl) butyl phosphite, dicresyl hexyl phosphite, dicresyl stearyl phosphite, diphenyl butyl phosphite, diphenyl stearyl phosphite, dibutyl-2,4-xylenyl phosphite, dibutyl phenyl phosphite, distearyl phenyl phosphite, distearyl cresyl phosphite, and so forth. The reaction in preparing the phosphonate from the phosphite of Formula 2 is preferably conducted in situ. The by-product phenol and/or alcohol formed during the reaction is separated from the reaction product on completion of the reaction or during the reaction as it progresses. The reaction is deemed completed when a negative iodine titer is obtained for phosphite in the reaction vessel.

The preferred polyols in this invention have been found to contain 1,3-hydroxyls, however appropriate polyols having one carbon atom between two carbon atoms having hydroxyl attached thereto may also be utilized. It is to be understood that polyols having two or more hydroxyls may be utilized in the practice of this invention to prepare the cyclic and bicyclic phosphites. Polyols having a formula $R''—C(CH_2OH)_3$ wherein R'' is as above defined may also be utilized. Included within the scope of the invention are polyols having hydroxyls on carbon atoms separated by one carbon atom such as the following:

2,5-bishydroxymethyl-hexanediol-(1,6)
2,5-dinitro-2,5-bishydroxymethyl-hexanediol-(1,6)
2,6-dinitro-2,6-bishydroxymethyl-heptanediol-(1,7)
2,7dinitro-2,7-dishydroxymethyl-octanediol-(1,8)
2-methylol-2-nitro-propanediol-(1,3)
4-methyl-2-methylolpentanediol-(1,3)
2-nitro-4-methyl-2-methylol-pentanediol-(1,3)
2-nitro-2-hydroxymethyl-butanediol-(1,4)
2-nitro-2-hydroxymethyl-pentanediol-(1,3)
2-nitro-2-hydroxymethyl-hexanediol-(1,3)
trimethylol isobutane
2-nitro-5-methyl-2-hydroxymethylhexanediol(1,3)
annhydroennea-heptitol
1,1,1,3,3,3-hexamethylol-propanol-2
2,2,6,6-tetramethylol-cyclohexanol-1
2,2,5,5-tetramethylol-cyclopentanol-1
beta,beta'-dihydroxy-t-butyl benzyl alcohol
2-hydroxymethyl-butanetriol-1,2
pentaerythritol monomethylether
pentaerythritol
dipentaerythritol
tripentaerythritol
trimethylol propane and other trimethylolalkanes, e.g., trimethylol ethane, trimethylol butane, trimethylol octadecane and trimethylol decane. Although polyols containing from 3 to about 14 hydroxyls may be employed in the practice of this invention, polyols having from 3 to 12 hydroxyls are preferred, with polyols containing from 3 to 8 hydroxyls being most favored.

With respect to the novel phosphonates of this invention of formula

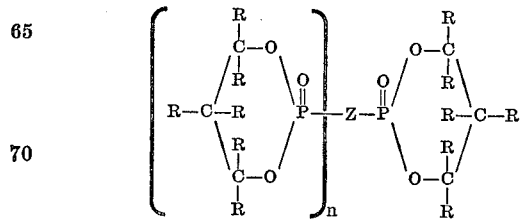

typical specific individual radicals that are illustrative but not limiting for R and Z are as follows:

Alkyl
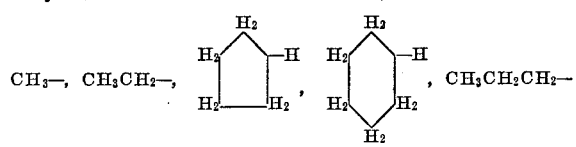
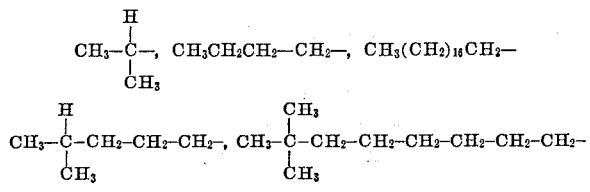
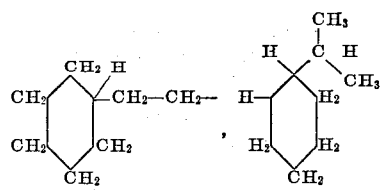
Aryl
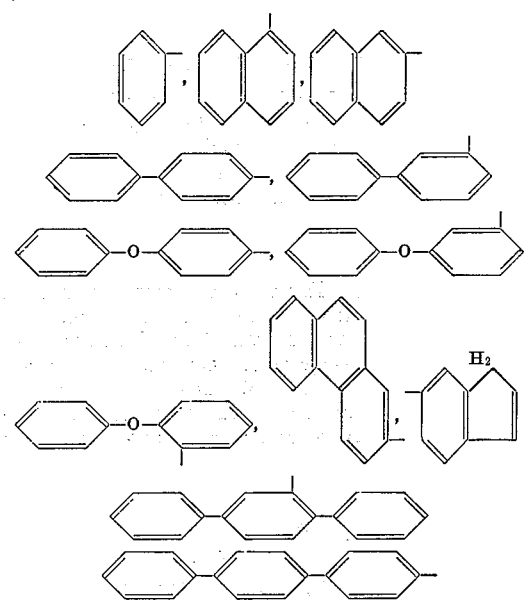
Halo substituted aryl
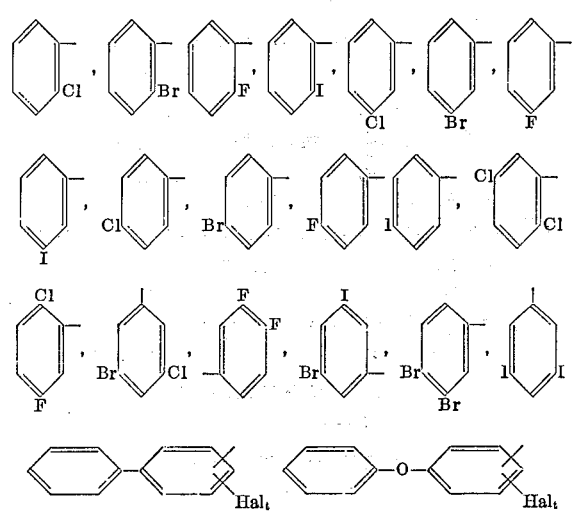
Hal is selected from Cl, Br, I, and F; and $t$ is an integer from 1 to four,
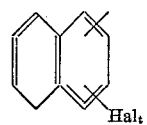
Hal is selected from Cl, Br, I, and F; and $t$ is an integer from 1 to four,
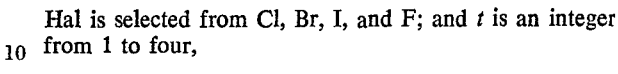
Hal is selected from Cl, Br, I, and F; and the sum of $g$ is an integer from 1 to seven,
Alkyl-substituted aryl
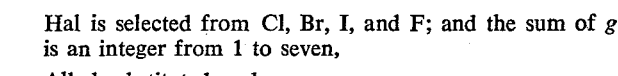
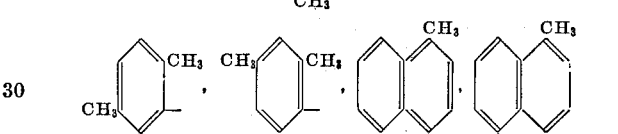
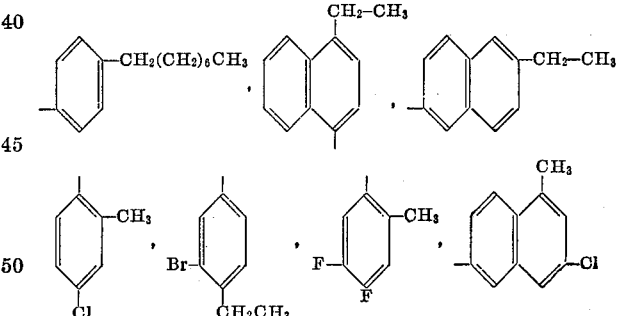
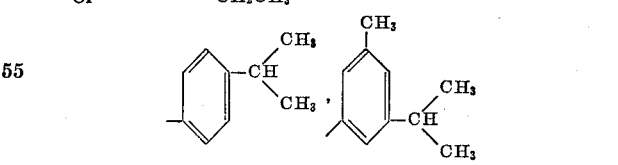
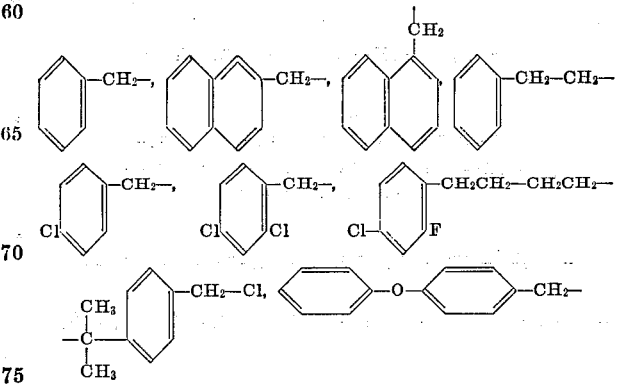

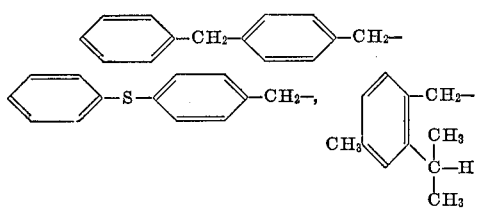

Hydroxy Alkyl

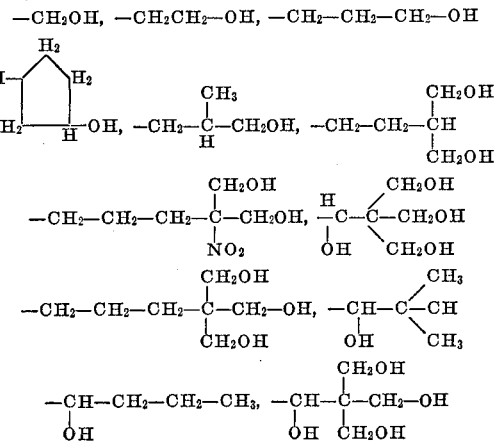

Hydroxy Alkoxy Alkyl

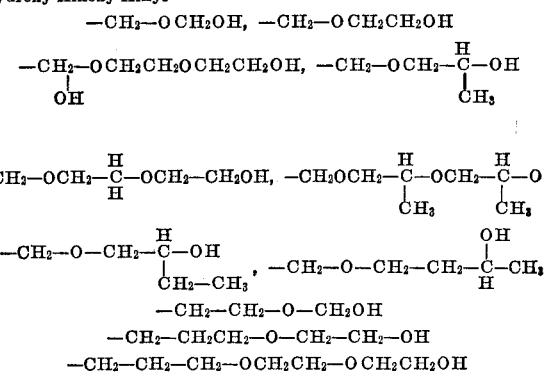

Alkylene $-CH_2CH_2CH_2-$, $-CH_2-CH_2-CH_2-CH_2-$
$-CH_2-CH_2-$, $-CH_2-CH_2CH_2-CH_2-CH_2-$ Substituted Alkylene

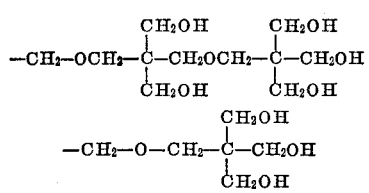

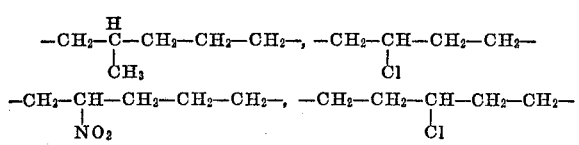

Alkoxyalkyl $-CH_2-O-CH_3$, $-CH_2-O-CH_2CH_3$, $-CH_2-O-CH_2CH_2CH_2CH_3$
$-CH_2-O-CH_2(CH_2)_7CH_3$, $-CH_2CH_2-O-CH_2CH_2-CH_2-CH_3$

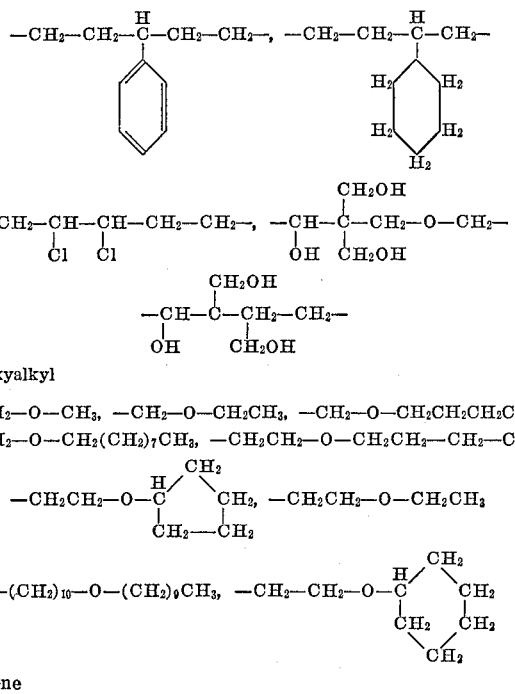

$-(CH_2)_{10}-O-(CH_2)_9CH_3$,

Alkene $CH_2=CH(CH_2)_4-$, $CH_2=CH-CH_2-$
$CH_2=CH-CH_2-CH=CH-(CH_2)_4-$

The cyclic and bicyclic phosphites, prepared in a manner disclosed above, that may be utilized in the practice of the invention may contain from 1 to 70 carbon atoms. However, more favorable results are obtained with phosphites containing from 1 to 32 carbon atoms and most phosphites having from 1 to 22 carbon atoms are utilized. Illustrative of the cyclic and bicyclic phosphites of this invention are:

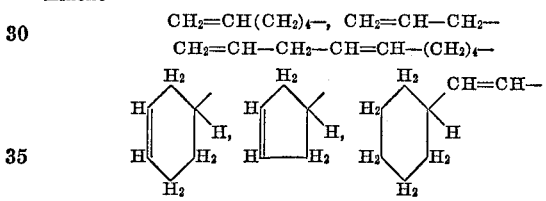

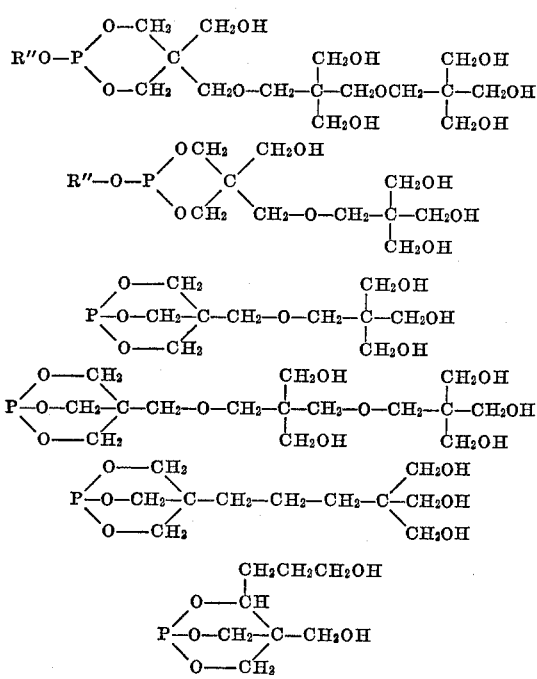

and

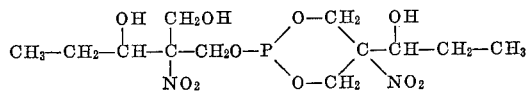

wherein R" is as defined above.

Among other phosphites that may be utilized as starting reactants in the practice of this invention are tris(2-methylphenyl)phosphite,
tris(3-methylphenyl)phosphite,
tris(4-methylphenyl)phosphite,
tris(2-chlorophenyl)phosphite,
tris(3-chlorophenyl)phosphite,
tris(4-chlorophenyl)phosphite,
tris(2,3-dichlorophenyl)phosphite,
tris(2,4-dichlorophenyl)phosphite,
tris(2,5-dichlorophenyl)phosphite,
tris(2,6-dichlorophenyl)phosphite,
tris(3,4-dichlorophenyl)phosphite,
tris(3-5-dichlorophenyl)phosphite,
tris(2-bromophenyl)phosphite,
tris(3-bromophenyl)phosphite,
tris(4-bromophenyl)phosphite,
tris(4-iodophenyl)phosphite,
tris(2-fluorophenyl)phosphite,
tris(2-chloro-4-bromophenyl)phosphite,
tris(3,5-dimethylphenyl)phosphite,
tris(2-ethylphenyl)phosphite,
tris(4-ethylphenyl)phosphite,
tris(2-cyclohexylphenyl)phosphite,
tris(4-octylphenyl)phosphite;
tris(3-isobutylphenyl)phosphite,
tris(4-dodecylphenyl)phosphite,
tris(2-amylphenyl)phosphite,
tris(4-butylphenyl)phosphite,
tris(2-tertiary butylphenyl)phosphite,
tris(2-secondary butylphenyl)phosphite,
tris(2-nitrophenyl)phosphite,
tris(3-nitrophenyl)phosphite,
tris(4-nitrophenyl)phosphite,
tris(2-methoxyphenyl)phosphite,
triphenylphenyl phosphite,
tris(alpha-naphthyl)phosphite,
tris(beta-naphthyl)phosphite, and
tris-1-(2,4-dibromo) naphthyl phosphite.

Most of these substituted triphenyl phosphites are old compounds. Those which are new can be formed in conventional fashion by refluxing the appropriate substituted phenol in excess with phosphorus trichloride, e.g., as shown in Kosolapoff, "Organophosphorus Compounds" (1950), page 183, and Mayle U.S. Pat. No. 2,220,845. Generally, triorganophosphites both aliphatic and aromatic having from 1 to 70 carbon atoms may be employed in the practice of this invention with the preferred organic phosphites containing from 1 to 22 carbon atoms, with the more preferred triorgano phosphites containing from 1 to 18 carbon atoms.

Arbuzov reagents which may be utilized in the practice of this invention are alkyl halides, alkylene halides, alkyl substituted alkylenes, cycloalkyl halides, aralkyl halides, and containing between about 1 and 70 carbon atoms with the preferred reagents having between 1–22 carbon atoms, with the most preferred having between about 1–18 carbons atoms. Examples of these reagents are, methyl iodide, butyl chloride, butyl iodide, pentyl fluoride, pentyl bromide, hexyl chloride, nonyl chloride, nonyl bromide, octyl iodide, octyl bromide, decyl bromide, isodecyl bromide, undecyl chloride, undecyl iodide, undecyl fluoride, hexadecyl bromide, hexadecyl chloride, stearyl chloride, 1,2-dibromoethane, 1,3-dichloropropane, 1,2-dibromo ethyl ether, 1,4-dichloro-2-ethoxybutane, alkyl chloride, methalkyl chloride, chloropropylene, chlorobutylene, bromopropylene, iodopropylene, fluorododecylene, dichlorobutylene, dichloropropylene, chlorobromo- iodobutene, chloromethylacetylene, bromomethylacetylene, dichlorododecylene, dibromo octadecylene, bromobutene, chlorobromopentene, dichlorobutane, dibromobutane, dibromo decane, difluoro eicosane, methylene iodide, ethylidene bromide, ethylene chlorobromide, propylidene iodide, oxatane dibromide, 1,2-propylene chloride, trimethylene chloride, amylene dibromide, 3,3-bisiodomethyl oxatane, 1,4-chloromethyl benzene, carbon tetrachloride, dichlorodibromomethane, acetylene tetrabromide, trichloroethylene, fluorochlorobromomethane, methyl chloroform, hexachloroethane, heptachloropropane, perbromoethylene, isomers of the above compounds, and so forth. A cycloalkyl halide as set forth above may be also utilized in the invention to form novel esters of phosphonic acid. Examples of these are chlorocyclopropane, dibromocyclopropane, dichlorocyclopropane, bromocyclobutane, bromocyclopentene, 2-chloroethyl, bromocyclooctane, chlorocycloheptane, 2-chlorocyclopentene, 2 - iodo - 1,3 - cyclohexadiene, 7,7-dichloro-norcarene, 7,7-dibromonorcarene, 1-chloro-1,3-dimethylcyclohexane, bromocyclopentane, bromodecalin, chlorodecalin, bromocyclotetradecane, chlorocyclopentadecane, 1,2-dibromocyclohexane, 1-iodo - 1 - methylcyclopentane, and so forth. It is preferred to utilize cycloalkyls containing between about 3 to 70 carbon atoms. With cycloalkyls containing about 3 to 13 carbon atoms being preferred and the most preferred cycloalkyls containing between about 3 to 7 carbon atoms. Examples of aralkyl halides and dihalides that may be utilized as an Arbuzov reagent in the practice of this invention are diphenylbromomethane, triphenylbromomethane, benzyl chloride, benzal chloride, benzotrichloride, chloromethylnaphthalene, 1-phenyl-1-chloroethane, bromomethylnaphthalene, chloromethylanthracene, bromomethylanthracene, 1-phenyl-2-chloroethane, benzyl bromide, 1-phenyl-2-bromoethane, 1-phenyl-2-chloropropane, bis-chloromethylnaphthalene, chloromethylpolystyrene, bromomethyltoluene, bromomethylxylene, dichlorobromomethylbenzene, chloromethylanisole, bisbromomethylanisole, bromomethylfluorine, and so forth. It is preferred to utilize an aralkyl containing between about 6 and 70 carbon atoms. It is preferred to utilize an aralkyl hydrocarbon having between about 6 and 12 carbon atoms, with the most preferred aralkyl hydrocarbons containing between about 6 and 10 carbon atoms. The ease of reaction varies with the nature of the halogen atom in the alkyl halide. The decreasing order of activity is alkyl iodine, alkyl bromide, alkyl chloride, alkyl fluoride.

The above Arbuzov reagents are merely illustrative and not to be considered as limiting the invention disclosed herein. It will be clear to those skilled in the art that the Arbuzov reaction or catalytic isomerization may also be effected by compounds selected from the group consisting of acyl halides, heteroalkyl halides, alpha-haloketones, alpha-haloamides, alpha-halonitrite, chlorocarbamates, beta-haloesters, epichlorohydrin, epibrimohydrin, and so forth.

Examples of other catalysts which may be utilized to cause an Arbuzov rearrangement are alkali metal halides, such as sodium iodide, potassium fluoride, sodium bromide, lithium iodide, cesium iodide, and so forth. Isomerization (Arbuzov rearrangement) may also be induced by various other reagents such as methyl sulfate, cuprous chloride, cuprous iodide, iodine or even by thermal means alone.

The products formed by following the teachings of this invention may be polymers wherein the polymer contains between 2 and 5 phosphorus atoms.

Products within the scope of this invention are pentaerythritol methyl phosphonate; dipentaerythritol methyl phosphonate; tripentaerythritol methyl phosphonate; pentaerythritol ethyl phosphonate; dipentaerythritol ethyl phosphonate; tripentaerythritol ethyl phosphonate; pentaerythritol-, dipentaerythritol-, and tripentaerythritol propane phosphonate; pentaerythritol-, dipentaerythritol- and tripentaerythritol isopropane phosphonates; pentaerythritol-, diepentaerythritol- and tripentaerythritol butane phosphonates; pentaerythritol-, dipentaerythritol- and tripentaerythritol iso-butane phosphonates; pentaerythritol-, dipentaerythritol- and tripentaerythritol hexane phosphonates; pentaerythritol-, diepentaerythritol- and tripentaerythritol isohexane phosphonates; pentaerythritol-, dipentaerythritol- and tripentaerythritol nonane phosphonates; pentaerythritol-, dipentaerythritol- and tripentaerythritol decane phosphonates; pentaerythritol-, dipentaerythritol- and tripentaerythritol dodecane phosphonates; pentaerythritol-, dipentaerythritol-, and tripentaerythritol octadecane phosphonates; pentaerythritol-, dipentaerythritol and tripentaerythritol eicosane phosphonates; bromodipentaerythritol methane phosphonate; iododipentaerythritol methane phosphonate; chlorodipentaerythritol ethane phosphonate; fluorotripentaerythritol hexane phosphonate; bromopentaerythritol octane phosphonate; chlorodipentaerythritol benzyl phosphonate; fluorotripentaerythritol alkyl phosphinate; bis(chloropentaerythritol)xylene bisphosphonate; bis(bromopentaerythritol) pentamethylene bisphosphonate; tetrakis (bromopentaerythritol) durenyl tetraphosphonate; dipentaerythritol - 1 - methylene naphthyl phosphonate; chloro-pentaerythritol tetrahydrofurane phosphonate; bromopentaerythritol trimethylol propane thiophene phosphonate; bromodipentaerythritol-3-methyl-5-trifluoromethane phenyl phosphonate and so forth. Some reactions which illustrate the formation of these compounds are as follows:

(1)

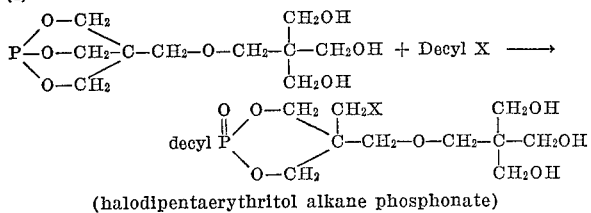

(halodipentaerythritol alkane phosphonate)

(2)

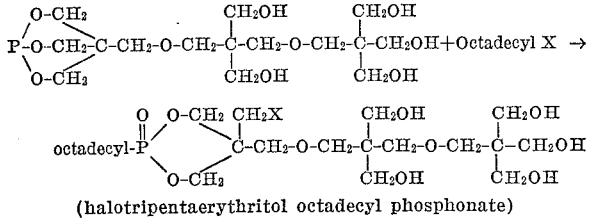

(halotripentaerythritol octadecyl phosphonate)

(3)

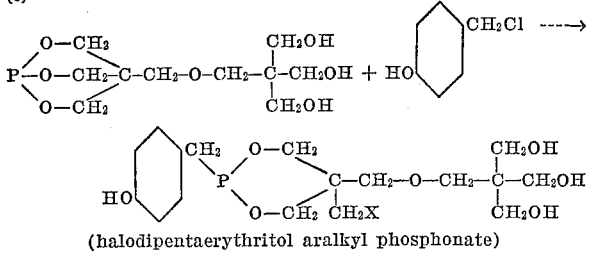

(halodipentaerythritol aralkyl phosphonate)

(4)

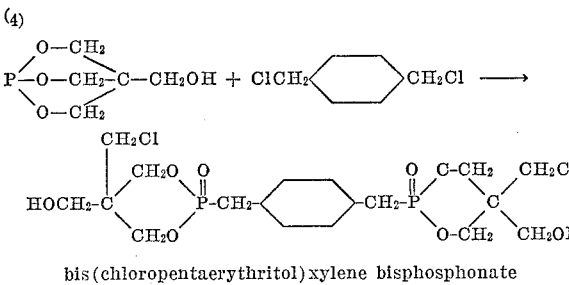

bis(chloropentaerythritol)xylene bisphosphonate (5)

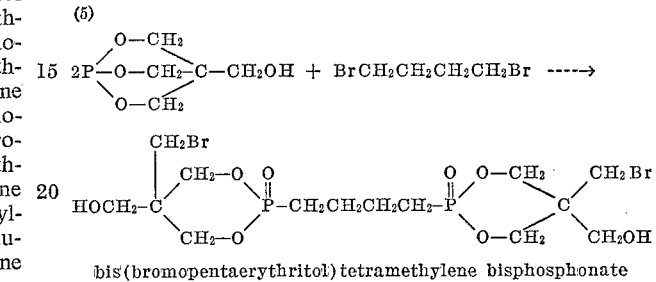

bis(bromopentaerythritol)tetramethylene bisphosphonate (6)

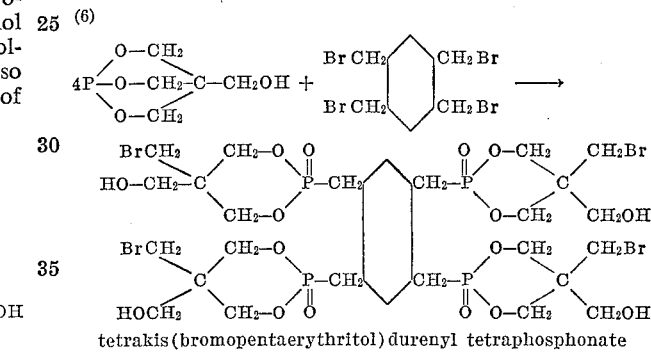

tetrakis(bromopentaerythritol)durenyl tetraphosphonate (7)

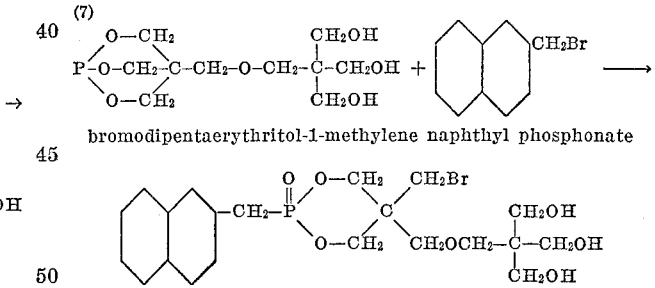

bromodipentaerythritol-1-methylene naphthyl phosphonate (8)

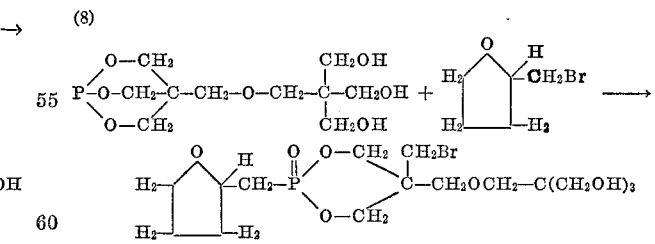

(9)

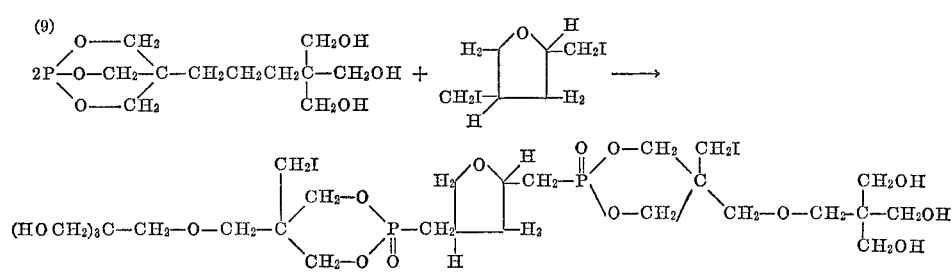

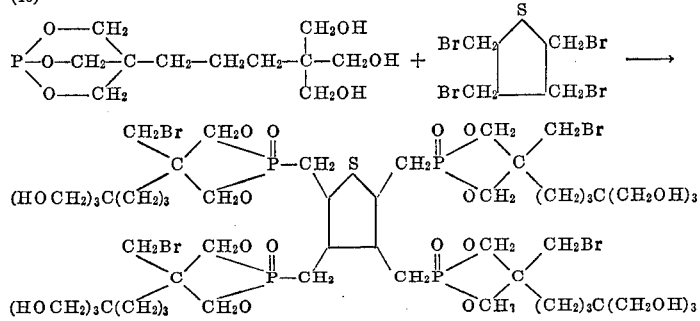

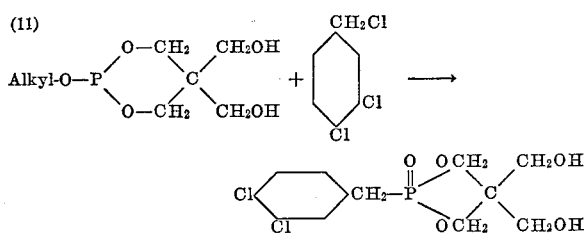

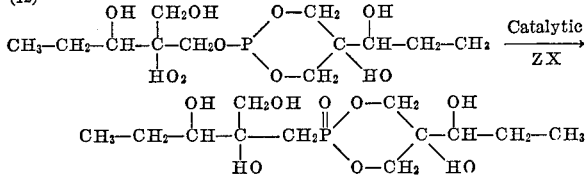

where Z is as defined above, wherein X is a halogen selected from the group consisting of iodine, bromine, and chlorine and alkyl is a hydrocarbon containing from 1 to 32 carbon atoms. Polymers of these monomers may also occur.

The reactions given illustrate various features of the invention, there being many more variations. The reactions of this invention may be carried out at temperatures of 25 degrees to 300 degrees centigrade. The preferred temperature range is between 75 degrees and 200 degrees centigrade, with a more preferred range being between 160 and 200 degrees centigrade. The preparation of the phosphites, as well as the Arbuzov rearrangement are carried out at temperatures within the range set forth above. However, it is to be understood that the temperature employed may be varied when subatmospheric and superatmospheric pressures are utilized. The preparation of the cyclic or bicyclic phosphites does not require a transesterification catalyst when the preparation of the phosphonate is to be carried out in situ. However, the preparation of the phosphites may be accelerated by utilizing a transesterification catalyst, e.g., a metal alcoholate, phenolate or hydride, such as sodium methylate, lithium methylate, potasium methylate, sodium ethylate, sodium isopropylate, sodium phenolate, potassium phenolate, sodium cresylate, sodium hydride, sodium metal, lithium metal and so forth, and diesters of phosphorous acid. It is preferred that the basic transesterification catalyst utilized have a pH of at least 7.5 in a 0.1 normal solution to be utilized in the reaction.

The Arbuzov rearrangement is deemed completed on obtaining a negative result in the iodine test for phosphite.

The starting phosphite from which the cyclic and bicyclic phosphites are to be prepared may be varied, depending upon the polyols and reacting phosphites to be utilized. It is to be understood that depending on the product desired triaryl phosphite may be converted to diaryl alkyl phosphite by reacting the triaryl phosphite with a molar proportion of an alcohol. For example, triphenyl phosphite may be reacted with butanol in the presence of a basic catalyst to yield diphenyl butyl phosphite. This phosphite may then be reacted with a polyol to form a predominantly cyclic phosphite product. Examples of alcohols which may be so utilized are methanol, ethanol, propanol, decanol, stearyl alcohol, isomers thereof and so forth.

In the preparation of the polyurethane compositions containing the novel esters of phosphonic acid disclosed in this invention, it is preferred to use a hydroxyl-containing polymeric material having 1 hydroxyl number from about 25 and about 900. Such a polymeric material can be a polyester, a polyether or mixtures thereof. Particularly suitable are mixtures of a polyester and a polyether wherein the polyester portion comprises at least 25 percent of the mixture. Excellent results are obtainable when less than 25 percent polyester is employed, but supplementary additives may be required to render such a foam self-extinguishing. It is especially preferred in the present invention to use a mixture of polyester and polyether in the ratio of 25 to 75 parts polyester to 75 to 25 parts of polyether. Generally, the hydroxyl-containing polymers have a molecular weight in the range from 200 to about 4,000.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. The carboxylic compounds can be aliphatic, cyclo aliphatic, aromatic, or heterocyclic and either saturated or unsaturated. Among the polycarboxylic compounds which can be used to form the polyester are: maleic acid; fumaric acid; phthalic acid; isophthalic acid; terephthalic acid; tetrachlorphthalic acid; aliphatic acids such as oxalic, malonic, succinic, glutaric and adipic; 1,4-cyclohexadiene-1,2-dicarboxylic acid and the like. Additional polycarboxylic compounds which can be used to form the polyester are Diels-Alder adducts of hexahalocyclopentadiene and a polycarboxylic compound, wherein the halogen is selected from the group consisting of chlorine, bromine, fluorine and mixtures thereof, for example: 1,4,5,6,7,7-hexachlorobicyclo-(2,2,1)-5-heptene-2,3-dicarboxylic acid; 1,4,5,6-tetrachloro-7,7-difluorobicyclo-(2.2.1)-5 - heptene-2,3 - dicarboxylic acid; 1,4,5,6,7,7 - hexabromobicyclo-(2.2.1)-5-heptene - 2,3 - dicarboxylic acid; 1,4,5,6 - tetrabromo-7,7-difluorobicyclo-(2.2.1)-5-heptene - 2,3 - dicarboxylic acid; and the like. Mixtures of any of the above polycarboxylic compounds can be employed. In order to obtain a satisfactory rigid foam, at least a portion of the total polyhydric alcohol component should consist of a polyhydric alcohol containing at least three hydroxyl groups. This is desired to provide a means for branching the polyester. Where an even more rigid structure is desire, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, triethylene glycol, propylene glycol, dipropylene glycol, other polypropylene glycols, butylene glycols, polybutylene glycols, and the like can also be used. Among the polyhydric alcohols which can be used are glycerol, hexanetriol, butanetriol, trimethylol propane, trimethylol ethane, pentaerylthritol, mannitol, sorbitol, cyclohexanediol-1,4-glycerol monoethyl ether and the like. The ratio of the polyhydric alcohol such as glycerol to the polybasic acid can be expressed as the hydroxyl-carboxyl ratio, which can be defined as the number of moles of hydroxyl groups to the number of moles of carboxyl groups in a given weight of resin. This ratio may be varied over a wide range. Generally, however, a hydroxyl-carboxyl ratio of between 1.5:1 to 5:1 is needed.

Instead of employing a polycarboxylic compound which is Diels-Alder adduct of hexahalocyclopentadiene and a polycarboxylic compound, a polyhydric alcohol which is a Diels-Alder adduct of hexahalocyclopentadiene and a polyhydric alcohol can be used. This is done by employing (A) a polyester resin comprised of the reaction product of (1) an adduct of hexahalocyclopentadiene and a polyhydric alcohol containing aliphatic carbon-to-carbon unsaturation, (2) a polycarboxylic compound and (3) a polyhydric alcohol containing at least three hydroxyl groups. Typical adducts include: 2,3-dimethylol-1,4,5,6,7,7 - hexachlorobicyclo-(2.2.1)-5-heptene; and 2,3-dimethylol-1,4,5,6-tetrachloro-7,7-difluorobicyclo-(2.2.1)-5-heptene. Similar compounds are disclosed in U.S. Pat. 3,007,958.

Where aromatic or bicyclo carboxylic compounds are used, aliphatic acids are sometimes incorporated into the polyester resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic, etc., can also be used.

The preferred polyesters are those which contain an adduct of hexahalocyclopentadiene co-reacted in the polyester portion in view of the fact that they contain a large amount of stable chlorine, thereby enhancing the flame-retardant characteristics of the resultant foam. Particularly preferred are those polyesters wherein the adduct is reacted in the polycarboxylic portion of the polyester, due to lower cost and commercial availability of the polycarboxylic adducts of hexahalocyclopentadiene.

The polyethers employed are known in the art, and are the reaction products of (1) either a polyhydric alcohol, a polycarboxylic acid or a polyphenolic compound, and (2) a monomeric 1,2-epoxide possessing a single 1,2-epoxy group, such as, for example, propylene oxide. The polyhydric alcohols and polycarboxylic acids which may be employed are any of the polyhydric alcohols and polycarboxylic acids hereinbefore listed. Polyphenolic compounds which can be employed are the reaction products of phenolic compounds with aldehydes, such as phenol-formaldehyde resins. Examples of monomeric 1,2-epoxides include ethylene oxide, propylene oxide, butylene oxide, isobutylene oxide, 2,3-epoxyhexane, 3-ethyl-2,3-epoxyoctane, epichlorohydrin, epibromohydrin, styrene oxide, glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, and the like. The preferred monoepoxides are the monoepoxide substituted hydrocarbons, the monoepoxy-substituted ethers, sulfides, sulfones and esters wherein the said compounds contain no more than eighteen carbon atoms. A lower alkylene oxide is preferably employed in rigid foams as the higher counterparts yield flexible rather than rigid products.

A large number of different organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used, among them phenyl diisocyanate;
alpha-naphthyl diisocyanate;
4-tolylene diisocyanate;
n-hexyl diisocyanate;
methylene-bis-(4-phenyl isocyanate);
3,3'-bitolylene-4,4'-diisocyanate;
3,3'-dimethoxy-4,4'-biphenylene diisocyanate;
1,5-naphthalene diisocyanate;
2,4-chlorophenyl diisocyanate;
hexamethylene diisocyanate;
ethylene diisocyanate;
trimethylene diisocyanate;
1,3-cyclopentylene diisocyanate;
1,2-cyclohexylene diisocyanate;
1,4-cyclohexylene diisocyanate;
cyclopentylidene diisocyanate;
cyclohexylidene diisocyanate;
p-phenylene diisocyanate;
m-phenylene diisocyanate;
4,4'-diphenyl propane diisocyanate;
4,4'-diphenyl methane diisocyanate;
1-methyl-2,4-phenylene diisocyanate;
4,4'-diphenylene diisocyanate;
1,2-propylene diisocyanate;
1,2-butylene diisocyanate;
ethylidene diisocyanate;
propylidene diisocyanate;
butylidene diisocyanate;
1,3,5-benzene triisocyanate;
2,4,6-tolylene triisocyanate;
2,4,6-monochlorobenzene triisocyanate;
4,4',4''-triphenylmethane triisocyanate;
polymethylene polyphenylisocyanate and mixtures thereof.

Higher isocyanates are provided by the liquid reaction products of (1) diisocyanates and (2) polyols or polyamines; etc. In addition isothiocyanates and mixtures of isocyanates may be employed. Also contemplated are the many inpure or crude polyisocyanates that are commercially available, such as crude mixtures of methylene bis (4-phenylisocyanate).

The catalyst employed can be any of the known conventional catalysts for isocyanate reactions, such as tertiary amines, for example, triethylamine, N-methyl morpholine, triethanolamine, etc., or antimony compounds such as antimony caprylate, antimony naphthenate, or antimonous chloride. In addition, tin compounds can be employed such as dibutyltin dilaurate, tri-n-octyltin oxide, hexabutylditin, tributyltin phosphate, or stannic chloride. Phosphorus acids, such as the alkyl acid phosphates, can also be employed. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

Any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoroethane, dichloromofluoromethane, monochloroethane, monochloromonofluoroethane, dichloromonofluoroethane, and difluorodichloroethane.

Another foaming system that is suitable for carrying out the foaming reaction at an elevated temperature is found in United States Pat. 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetra (hydroxymethyl) phosphonium chloride. In addition, mixtures of the above foaming agents can be employed.

In preparing the polyurethane compositions of this invention, the hydroxyl containing polymer, either alkyd resin or polyether, and polyisocyanate are preferably reacted in a ratio sufficient to provide about eighty-five to one hundred and fifteen percent of isocyanato groups with respect to the total number of hydroxyl and carboxyl groups present in the hydroxyl-containing polymeric material (and the foaming agent, if one is provided). The reaction temperature generally ranges from about twenty to about one hundred and twenty degrees centigrade, although higher and lower temperatures can be used.

The phosphonates of the present invention may be utilized in the range of from about 0.2 to 30 percent of the polyol component contained in the Urethane Foam System; however, the preferred range being from about 5 to about 25 percent, with best results for flame-retarding being obtained when from 10 to 20 percent of the polyol component contained in the Urethane Foam System is the novel esters of phosphonic acid of the present invention. The Urethane Foam System described above does include the weight of the blowing agent, catalyst, and surfactant.

The polyol phosphonate may be blended by means known to the art with the other components of the Urethane Foam System at temperatures ranging from 0 to about 150 degrees centigrade—although usually temperatures of 25–50 degrees centigrade are utilized.

In addition to the polyurethane the phosphonates of this invention may be utilized as flame-retarding additives or reactants in other plastic systems, such as the polyesters, polyacrylates, polymethacrylates, polyepoxides, polyvinylchlorides, phenylaldehyde polymers, polyamides, and so forth.

The following examples illustrate the invention, but do not limit it. All parts are by weight and temperatures are in degrees centigrade unless otherwise stated.

EXAMPLE 1

Triphenyl phosphite (4 gram moles), n-butanol (8 gram moles), and NaH (2 grams) were reacted in a vessel for two hours at a temperature of 120 degrees centigrade. Pentaerythritol (4 moles) was then added to the reaction vessel. A temperature of 100 degrees centigrade was maintained for three hours to dissolve the pantaerythritol in the reaction mixture. To assure transesterification, sodium hydride (1 gram) was added and the reaction mixture was heated at 120 degrees centigrade for two hours. An Arbuzov rearrangement was accomplished by adding butyl bromide (63 grams) to the reaction mixture and heating the mixture at 153 degrees centigrade until no residual phosphite was observed by iodine titration. A yellowish liquid of syrupy consistence was obtained after distillation of volatiles at about 100 degrees centigrade under vacuum of from 10 to 50 millimeters of mercury. Infrared analysis indicated the structure of the compound to be

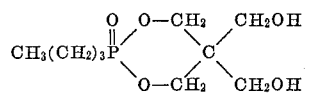

Pentaerythritol butane phosphonate

In the subsequent examples moles are defined as gram moles.

EXAMPLE 2

Dibutyl phenyl phosphite (8.48 moles), dissolved in solvent phenol (1420 grams), and pentaerythritol (8.48 moles) were placed in a reaction vessel. This reaction mixture was heated to about 125 degrees centigrade and maintained at about this temperature for about one hour to obtain a liquid reaction mixture. Sodium hydride (4 grams) was then added and the reaction mixture was heated to 135 degrees centigrade and maintained at about this temperature for a period of about two hours. Butylbromide (338 grams) was then added to the reaction mixture. This mixture was maintained at a temperature of from about 140 to 154 degrees centigrade for approximately 14.5 hours, until a negligible iodine titer for phosphite was obtained. The volatiles were separated as in Example 1. The results of infrared analysis indicated the structure of the viscous yellow product to be

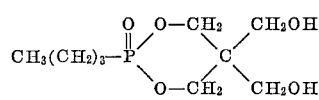

Pentaerythritol butane phosphonate

A 97.5 percent yield was obtained based on dibutyl phenyl phosphite.

EXAMPLE 3

Dibutylphenyl phosphite (1 mole), pentaerythritol (1 mole), and phenol solvent (136.2 grams) were charged into a reaction vessel and heated to a temperature of about 135 degrees centigrade for 1.5 hours to effect a transesterification. To this reaction mixture was added butylbromide (.1 mole) and the reaction mixture was heated to a temperature between 150 and 160 degrees centigrade for a period of ten hours. The volatiles were removed from the product as in Example 1. The product obtained had a yellow oily appearance. Infrared analysis of the product indicated the following formula:

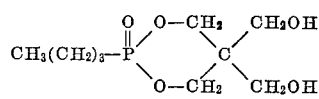

The product was analysed for precent phosphorus. Found: 12.6 percent phosphorus. Calculated: 13 percent phosphorus.

A 95.5 percent yield, based on dibutylphenyl phosphite, was obtained. The theoretical molecular weight of this composition is 238 and the actual molecular weight found in acetone was 238.

EXAMPLE 4

Triphenylphosphite (10 moles), butanol (20 moles), and sodium hydride (6 grams) were reacted in a vessel at about 135 degrees centigrade for 2.5 hours. Pentaerythritol (10 moles) and solvent phenol (1,675 grams) were added to the mixture and the mixture was heated for 2.5 hours at about 135 degrees centigrade. An additional 6 grams of sodium hydride were added to the reaction mixture during this time to increase the rate of reaction. Ethylene chlorohydrin (10 moles) was added to the reaction mixture and the mixture was heated to reflux temperature (pot temperature between about 153 and 167 degrees centigrade) for a period of 20.5 hours. At the end of this time, a negligible iodine titer was obtained. Infrared analysis indicated that the structure of the product obtained, after distilling the volatiles as in Example 1, was $$CH_3(CH_2)_3-\overset{O}{\underset{\|}{P}}\underset{O-CH_2}{\overset{O-CH_2}{<}}>C<\underset{CH_2OH}{\overset{CH_2OH}{<}}$$

The product was viscous, had a yellowish appearance and was obtained in 92 percent yield, based on triphenylphosphite.

EXAMPLE 5

Triphenyl phosphite (1.5 moles), dipentaerythritol (1.5 moles), phenol solvent (847 grams) and 25 percent sodium methoxide in methanol (3.3 grams) were mixed in a vessel and heated for approximately 12 hours at from about 125 to 160 degrees centigrade to effect solution and reaction. The reaction mixture was vacuum stripped of by-product phenol at about 20 millimeters mercury absolute pressure at about 100 degrees centigrade leaving a residue of the product, dipentaerythritol monophosphite. It was obtained in nearly theoretical yield as a hard wax with a melting point of about 115 degrees centigrade. Infrared analysis of this product showed that the phosphite formula was consistent with structure $$P\underset{O-CH_2}{\overset{O-CH_2}{<}}>C-CH_2-O-CH_2-C(CH_2OH)_3$$

Dipentaerythritol monophosphite. Phosphorus analysis was: Calculated, percent phosphorus, 11; actual, percent phosphorus, 10.

EXAMPLE 6

Dipentaerythritol monophosphite (1 mole) prepared in accordance with Example 5, was dissolved in dimethyl formamide (252 grams) and isomerized (rearranged) with decyl bromide (1 mole) at 158 degrees centigrade for 50 hours. By-product volatiles was then vacuum stripped at about 55 degrees centigrade at 15 millimeters mercury pressure, absolute. The product was found to be free of the starting phosphite, by iodine titration. Infra red analysis of the residue indicated the structure of the product to be:

$$CH_3-(CH_2)_9-\overset{O}{\underset{\|}{P}}\underset{O-CH_2}{\overset{O-CH_2}{<}}>\underset{|}{C}<\underset{CH_2OCH_2}{\overset{CH_2Br}{<}}\underset{|}{C}-CH_2OH$$

Bromodipentaerythritol decane phosphonate

EXAMPLE 7

Utilizing the dipentaerythritol monophosphite (1 mole) of Example 5, dimethyl formamide solvent (118 grams) and 5 chloromethylethyl furoate (1 mole), the corresponding chlorodipentaerythritol-5-methylene-ethyl furoate phosphonate was obtained after heating the mixture for from 45 to 60 hours at from 158 to 175 degrees centigrade with vacuum distillation of volatiles at about 15 millimeters of mercury at about 160 degrees centigrade. This phosphonate was shown to be free of starting phosphite by iodine titration. The product was subjected to infra red analysis and indicated the structure to be $$C_2H_5O\overset{O}{\underset{\|}{C}}-\underset{O}{\overset{}{\diagdown}}-CH_2-\overset{O}{\underset{\|}{P}}\underset{O-CH_2}{\overset{O-CH_2}{<}}>C<\underset{CH_2-O-CH_2-C(CH_2OH)}{\overset{CH_2Cl}{<}}$$

In the following examples, when the procedure of Example 7 is followed, using the indicated reactants, the products obtained are as indicated.

EXAMPLE 8

Reactants:                                                       Moles
   Dipentaerythritol monophosphite _____ 1
   Benzyl chloride _____ 1

Product:

$$\bigcirc-CH_2-\overset{O}{\underset{\|}{P}}\underset{O-CH_2}{\overset{O-CH_2}{<}}>C<\underset{CH_2-O-CH_2-C(CH_2OH)_3}{\overset{CH_2Cl}{<}}$$

Chlorodipentaerythritol benzyl phosphonate

EXAMPLE 9

Reactants:                                                       Moles
   Dipentaerythritol monophosphite _____ 1
   Furfuryl chloride _____ 1

Product:

$$\underset{O}{\diagdown}-CH_2-\overset{O}{\underset{\|}{P}}\underset{O-CH_2}{\overset{O-CH_2}{<}}>C<\underset{CH_2OCH_2-C(CH_2OH)_3}{\overset{CH_2Cl}{<}}$$

Chlorodipentaerythritol furfuryl phosphonate

EXAMPLE 10

Reactants:                                                       Moles
   Triphenyl phosphite _____ 1
   Dipentaerythritol monophosphite _____ 1

The process of Example 5 for formation of the dipentaerythritol monophosphite was repeated except that the phenol was not isolated from the phosphite product.

EXAMPLE 11

Reactants:                                                       Moles
   Triphenyl phosphite _____ 1
   Dipentaerythritol _____ 1
   Benzyl bromide _____ 1

The process of Example 6 for the preparation of bromodipentaerythritol decane phosphonate was repeated and the phosphonate was formed in situ without first stripping the phenol by-product formed. The phosphonate product was isolated after vacuum stripping of volatiles as in Example 6. The product formed, as indicated by infra red analysis has the structural formula:

$$\bigcirc-CH_2-\overset{O}{\underset{\|}{P}}\underset{O-CH_2}{\overset{O-CH_2}{<}}>C<\underset{CH_2-OCH_2-C(CH_2OH)_3}{\overset{CH_2Br}{<}}$$

EXAMPLE 12

Reactants:                                                       Moles
   Triphenyl phosphite _____ 1
   Dipentaerythritol _____ 1
   5-chloromethyl-ethyl furoate _____ 1

When the process of Example 11 is repeated with the above reactants, corresponding chlorodipentaerythritol-5-methylene-ethyl furoate phosphonate was recovered having the following structure as the final product.

$$C_2H_5O\overset{O}{\underset{\|}{C}}-\underset{O}{\overset{}{\diagdown}}-CH_2-\overset{O}{\underset{\|}{P}}\underset{O-CH_2}{\overset{O-CH_2}{<}}>C<\underset{CH_2-O-CH_2-C(CH_2OH)_3}{\overset{CH_2Br}{<}}$$

Phosphorus analysis were: Calculated, percent phosphorus, 6.6; actual, percent phosphorus, 6.0.

EXAMPLE 13

Reactants: Moles
- Triphenyl phosphite _____ 1
- Dipentaerythritol _____ 1
- Benzylchloride _____ 1

When the process of Example 11 is repeated with the above reactants, corresponding chlorodipentaerythritol benzyl phosphonate is formed. The structural formula may be indicated by:

$$\text{Ph-CH}_2-\overset{O}{\underset{\parallel}{P}}\begin{pmatrix} O-CH_2 \\ O-CH_2 \end{pmatrix}C\begin{pmatrix} CH_2Cl \\ CH_2-O-CH_2-C(CH_2OH)_3 \end{pmatrix}$$

EXAMPLE 14

Reactants: Moles
- Triphenyl phosphite _____ 1
- Dipentaerythritol _____ 1
- Furfuryl chloride _____ 1

When the process of Example 11 is repeated the corresponding chloro-dipentaerythritol furfuryl phosphonate:

$$\text{(furfuryl)-CH}_2-\overset{O}{\underset{\parallel}{P}}\begin{pmatrix} O-CH_2 \\ O-CH_2 \end{pmatrix}C\begin{pmatrix} CH_2Cl \\ CH_2-O-CH_2-\underset{\underset{CH_2OH}{|}}{\overset{CH_2OH}{|}}{C}-CH_2OH \end{pmatrix}$$

will be recovered.

EXAMPLE 15

Pentaerythritol phosphite, $HOCH_2C(CH_2O)_3P$, was prepared as a white crystalline product by the sodium methoxide catalysis of triphenyl phosphite (1 mole) with pentaerythritol (1 mole), utilizing a phenol solvent. The pentaerythritol phosphite was obtained in 85 percent yield. The by-product phenol was stripped by distillation at 115 degrees centigrade under 3 millimeters of mercury absolute. The product had a melting point of about 62 degrees centigrade. Phosphorus analysis were: Calculated, percent phosphorus, 18.9; actual, percent phosphorus, 19.1.

Infrared data indicates the identity of the product to be pentaerythritol phosphite as set forth above.

In a like manner when tripentaerythritol is substituted for dipentaerythritol, tripentaerythritol phosphite having a structural formula $$P\begin{pmatrix} O-CH_2 \\ O-CH_2 \\ O-CH_2 \end{pmatrix}C-CH_2-O-CH_2-C(CH_2OH)_2-CH_2O-CH_2-C(CH_2OH)_3$$

is obtained.

EXAMPLE 16

Reactants: Moles
- Pentaerythritol phosphite _____ 4
- 1,4-bischloromethyl benzene _____ 1

The reaction mixture was held in the range of 150–210 degrees centigrade until iodine titration indicated that no phosphite remained. Bis-chloropentaerythritol xylylene diphosphonate $$\begin{pmatrix} ClCH_2 \\ HOCH_2 \end{pmatrix}C\begin{pmatrix} CH_2-O \\ CH_2-O \end{pmatrix}\overset{O}{\underset{\parallel}{P}}-CH_2-\bigcirc-CH_2-\overset{O}{\underset{\parallel}{P}}\begin{pmatrix} O-CH_2 \\ O-CH_2 \end{pmatrix}C\begin{pmatrix} CH_2Cl \\ CH_2OH \end{pmatrix}$$

was recovered as the final product after stripping the distillates at from about 160 degrees centigrade. The product was white and glasslike in appearance and had a melting point of from about 105 to 108 degrees centigrade.

Phosphorus analysis were: Calculated, percent phosphorus, 12.32; actual, percent phosphorus, 12.1.

In the following examples, when the process of Example 16 is followed the products obtained with the reactants mentioned are as indicated.

EXAMPLE 17

Reactants: Moles
- Pentaerythritol phosphite _____ 2
- 3,3-bisiodomethyl oxetane _____ 1

Product:

$$\begin{pmatrix} ICH_2 \\ HOCH_2 \end{pmatrix}C\begin{pmatrix} CH_2-O \\ CH_2-O \end{pmatrix}\overset{O}{\underset{\parallel}{P}}-CH_2-C\begin{pmatrix} CH_2 \\ CH_2 \end{pmatrix}O-CH_2-\overset{O}{\underset{\parallel}{P}}\begin{pmatrix} O-CH_2 \\ O-CH_2 \end{pmatrix}C\begin{pmatrix} CH_2I \\ CH_2OH \end{pmatrix}$$

Bis-iodopentaerythritol-3,3-bismethylene oxetane diphosphonate

EXAMPLE 18

Reactants: Moles
- Pentaerythritol phosphite _____ 2
- Trimethylene bromide _____ 1

Product:

$$\begin{pmatrix} BrCH_2 \\ HOCH_2 \end{pmatrix}C\begin{pmatrix} CH_2-O \\ CH_2-O \end{pmatrix}\overset{O}{\underset{\parallel}{P}}-CH_2CH_2CH_2-\overset{O}{\underset{\parallel}{P}}\begin{pmatrix} O-CH_2 \\ O-CH_2 \end{pmatrix}C\begin{pmatrix} CH_2Br \\ CH_2OH \end{pmatrix}$$

Bis-bromopentaerythritol trimethylene diphosphonate

EXAMPLE 19

Reactants: Moles
- Tripentaerythritol monophosphite _____ 1
- Decyl bromide _____ 1

Product:

$$CH_3-(CH_2)_9-\overset{O}{\underset{\parallel}{P}}\begin{pmatrix} O-CH_2 \\ O-CH_2 \end{pmatrix}C\begin{pmatrix} CH_2Br \\ CH_2OCH_2\underset{\underset{CH_2OH}{|}}{\overset{CH_2OH}{|}}{C}-CH_2-O-CH_2-\underset{\underset{CH_2OH}{|}}{\overset{CH_2O}{|}}{C}-CH_2OH \end{pmatrix}$$

Bromotripentaerythritol decane phosphonate

EXAMPLE 20

Reactants: Moles
- Tripentaerythritol monophosphite _____ 1
- Benzyl chloride _____ 1

Product:

$$\text{Ph-CH}_2-\overset{O}{\underset{\parallel}{P}}\begin{pmatrix} O-CH_2 \\ O-CH_2 \end{pmatrix}C\begin{pmatrix} CH_2Cl \\ CH_2-O-CH_2-\underset{\underset{CH_2OH}{|}}{\overset{CH_2OH}{|}}{C}-CH_2OCH_2C(CH_2OH)_3 \end{pmatrix}$$

Chlorotripentaerythritol benzyl phosphonate

EXAMPLE 21

Reactants: Moles
- Tripentaerythritol monophosphite --- 1
- Furfuryl chloride --- 1

Product:

Chlorotripentaerythritol furfuryl phosphonate

EXAMPLE 22

Reactants: Moles
- Tripentaerythritol monophosphite --- 1
- 5-chloromethyl-2-ethyl furoate --- 1

Product:

Chlorotripentaerythritol-5-methylene-2-ethyl furoate phosphonate

EXAMPLE 23

Reactants: Moles
- Tripentaerythritol monophosphite --- 1
- Butyl iodide --- 1

Product:

Ioditripentaerythritol butane phosphonate

EXAMPLE 24

Reactants: Moles
- Tripentaerythritol monophosphite --- 1
- Octadecyl bromide --- 1

Product:

Bromotripentaerythritol octadecane phosphonate

EXAMPLE 25

Reactants: Moles
- Tripentaerythritol monophosphite --- 1
- Allyl bromide --- 1

Product:

Alkyl phosphinate
Bromotripentaerythritol allyl phosphonate

Following the teachings of Example 2 the following products are formed from the reactants indicated in Examples 26 and 27.

EXAMPLE 26

Reactants: Moles
- Triphenyl phosphite --- 1
- 2-nitro-2-hydroxymethyl hexane diol-(1,3) --- 2
- Hexyl chloride --- 0.1

Product:

EXAMPLE 27

Reactants: Moles
- Triphenyl phosphite --- 1
- 1,1,1,3,3,3-hexamethylol propanol-(2) --- 2
- Benzyl chloride --- 1

Product:

Chloro-1,1,1,3,3,3-hexamethylol propanol-2-benzyl phosphonate

EXAMPLE 28

Triphenyl phosphite (20 moles) and trimethylol propane (40 moles) were reacted in a reaction vessel for about one hour and thirty minutes at a temperature of 135 degrees centigrade. The reaction mixture was then heated to a temperature between about 185 degrees and 205 degrees centigrade and maintained at this temperature for a period of 9 hours to effectuate thermal isomerization as indicated by a negligible iodine titer. The product formed was isolated by distilling phenol therefrom at 125 degrees centigrade under a pressure of 10 millimeters of mercury absolute.

According to theory and an infrared analysis thereof, the product formed was of the structure:

EXAMPLE 29

The phosphonate formed in accordance with Example 28 was incorporated into a polyurethane foam system as follows:

Polyester

A polyester was prepared by the esterification of 10 moles (1340 parts) of trimethylol propane with 60 moles (877 parts) of adipic acid. The resin thus formed had a hydroxyl number of 504.

Mixture A

To 70 parts of the above described polyester resin the following was added:

|  | Parts |
| --- | --- |
| Polyol phosphonate prepared in accordance with Example 28 | 30 |
| Trichlorofluoromethane | 28 |
| Silicone surfactant, such as silicone X-520 | 0.5 |
| Tetramethyl butane diamine | 0.8 |

The ingredients were then mixed until a homogeneous mixture was obtained.

Prepolymer

A prepolymer was prepared by the addition of 20 parts of the above described polyester to 80 parts of toluene diisocyanate (a mixture of 80% 2,4-toluene diisocyanate, and 20% 2,6-toluene diisocyanate). This mixture was heated at 80–100 degrees centigrade for ½ hour.

The above prepolymer (117 parts) was added to 129.3 parts of Mixture A. They were mixed for 30 seconds and the mixture was poured to yield a fine, closed-celled rigid foam. This foam had the following physical properties:

Density: 2.33 pounds per cubic foot
Compressive yield pressure: 29.2 pounds per square inch
Underwriters' Laboratory Flame Test UL-484: 108.2 seconds per 2.96 inches burned. (A modified American Society for Testing Material D-1692-59T.)

EXAMPLE 30

A foam prepared by the above procedure without the phosphonate of Example 28 present had the following properties:

Density: 2.23 pounds per cubic foot
Compressive yield pressure: 30.9 pounds per sq. in.
UL-484 Test: 152 seconds for an entire 6″ specimen.

The results of Examples 29 and 30 indicate that the polyol phosphonate polyurethane foam composition of this invention is fire retardant, while also retaining the desirable density and compressive yield properties of such a material without the polyol phosphonate.

EXAMPLE 31

The following reactants were mixed in a reaction vessel and held for about two hours at 135 degrees centigrade, with stirring:

Triphenyl phosphite—4 moles (1240 parts)
n-Butanol—8 moles (592 parts)
Trimethylol propane—5 moles (671 parts)
Sodium hydride—2 parts To the above mixture, after about two hours, was added 4 moles (322 parts) of chlorohydrin, and the resulting mixture was then refluxed about 6 hours at 135 degrees centigrade.

The butyl chloride was then distilled off at atmospheric pressure until a pot temperature of 175 degrees centigrade was reached. After removing the butyl chloride, the residual contents of the reaction mixture was found to have a negligible iodine titer, i.e., less than 1.0 percent of the original titer.

The remaining butyl chloride, excess butanol, by-product phenol and other volatiles were removed under decreasing vacuum conditions until an ultimate pot temperature of about 160 degrees at 3 millimeters of mercury absolute was achieved.

The residual product was a phosphonate of structure:

$$HOCH_2CH_2-\overset{O}{\underset{}{P}}\diagdown\begin{matrix}O-CH_2\\ \\O-CH_2\end{matrix}\diagup\underset{CH_2CH_3}{\overset{}{C}}-CH_2OH$$

Trimethylol Propane Hydroxyethyl Phosphonate

A slight acidity in the resulting phosphonate was eliminated by refluxing with excess propylene oxide (340 parts of the above phosphonate, with 673 parts of propylene oxide) for about 6 hours at 37 degrees centigrade pot temperature. The residue was removed at a temperature of 140 degrees centigrade at 25 millimeters of mercury. This residue corresponded to trimethyl propane hydroxyethyl phosphonate.

EXAMPLE 32

The phosphonate formed in accordance with Example 31 was incorporated into a polyurethane foam system as follows:

Polyester

This polyester was prepared in accordance with Example 29, substituting the phosphonate of Example 31.

Mixture B

To 60 parts of the polyester described in Example 29 the following were added:

|  | Parts |
| --- | --- |
| Phosponate of Example 31 | 40 |
| Trichlorofluoromethane | 28 |
| Silicone surfactant, such as Silicone X-520 (made by Union Carbide Co.) | 0.5 |
| Tetramethyl butane diamine | 0.8 |

The ingredients were then mixed until homogeneity was obtained.

The prepolymer of Example 29 (125 parts) was added to Mixture B. A foam was formed in a manner similar to that disclosed in Example 29. This foam had a flame retardance of 36.2 seconds per 1.14 inches burned as indicated by Underwriters' Laboratory Test 484.

EXAMPLE 33

Triphenyl phosphite (4 moles, 1240 parts), n-butyl alcohol (8 moles, 593 parts) and sodium hydride (2 parts) were charged to a reaction vessel and transesterified for about two hours at 120 degrees centigrade. After about two hours, pentaerythritol (4 moles, 544 parts) was added to the mixture. This mixture was heated at about 100 degrees centigrade for about three hours to dissolve the pentaerythritol. Transesterification was accomplished by adding 1 part of sodium hydride to this mixture and heating at about 120 degrees centigrade for about 2 hours. After this time, butyl bromide (63 parts) was added to the reaction vessel. The mixture formed was then heated at 150 degrees centigrade until an iodine titer of less than about one percent of the starting iodine titer was obtained. The product was viscous and yellow in appearance. The structure of the phosphonate formed is $$CH_3(CH_2)_3-\overset{O}{\underset{}{P}}\diagdown\begin{matrix}O-CH_2\\ \\O-CH_2\end{matrix}\diagup\overset{}{C}\diagdown\begin{matrix}CH_2OH\\ \\CH_2OH\end{matrix}$$

Infrared analysis of this compound gives evidence to support this structure.

EXAMPLE 34

A urethane foam incorporating the phosphonate prepared in accordance with Example 32 was prepared as follows:

Polyester

The polyester was prepared by the esterification of 1 mole (134 parts) of trimethylol propane with 0.75 mole (292 parts) of HET® Acid (1,4,5,6,7,7-hexachlorobicyclo(2.2.1)-5-heptene-2,3-dicarboxylic acid). This mixture was heated to 75 degrees centigrade and then propylene oxide (262 parts) was added. The temperature was then maintained at 100 degrees centigrade for 5 hours. Unreacted propylene oxide was distilled out at 103 degrees centigrade at 4 millimeters of mercury absolute. The hydroxyl number of this polyester was 263.

Mixture C

To 80 parts of the above polyester were added 20 parts of the phosphonate prepared as in Example 33.

|  | Parts |
|---|---|
| Trichlorofluoromethane | 28 |
| Silicone surfactant, e.g. X-520 Silicone (made by Union Carbide Co.) | 1 |
| Dibutyl tin dilaurate | 1 |

To 130 parts of the above Mixture C were added 66 parts of toluene diisocyanate. This was mixed 30 seconds to form a fine-celled rigid foam. This foam showed marked improvement in flame-retardance over a similar polyurethane foam without the polyol phosphonate, as indicated by an American Society for Testing Material Test D-757 value of 0.755 inch per minute for the phosphonate-containing foam.

EXAMPLE 35

This example illustrates the retardation of flame and after-glow in varnishes which incorporate the phosphonates of the present invention:

(A) Preparation of alkyl.—Pentaerythritol butane phosphonate (307), prepared in accordance with Example 2, a distilled, soya, fatty acid (317 parts), e.g., Emery 618, and phthalic anhydride (116 parts) were mixed in a reaction vessel and heated at a temperature of about 200 degrees centigrade for approximately seven hours. The acidity in the mixture was removed by treatment with epichlorohydrin.

(B) Preparation of varnish.—The above prepared alkyd (102.5 parts) was blended with xylene (102.5 parts) lead naphthenate (.08 part of a 25% solution of lead naphthenate in xylene and cobalt naphthenate (.3 part) of a 6 percent solution of cobalt naphthenate in xylene.

This formulated varnish was painted on small wooden pine strips 3 inches by 4 inches which were then oven cured to a hard film at 80 degrees centigrade for 10 hours.

When tested, the wooden strips painted with the above formulated polyol phosphonate varnish exhibited a high degree of flame-retardance, when compared with the untreated controls.

Also significant was the lack of after-glow in the painted wooden strips, as compared with the after-glow which appeared in tests run with untreated wooden control specimens.

While the invention has been set forth in the above description and examples, it should be realized that in its broadest aspects, the invention is not so limited. Many modifications will become apparent to one skilled in the art upon a reading of this disclosure.

What is claimed is:

1. An ester of phosphonic acid, of the formula

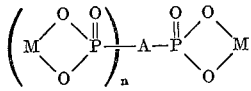

having from 4 to 54 carbon atoms and from 2 to 11 hydroxyls, wherein M is a residue of a polyol wherein two hydroxyls are removed from carbon atoms with hydroxyls attached thereto and with a carbon atom between the two carbon atoms from which the hydroxyl groups have been removed, said polyol being of 3 to 15 carbon atoms and having from 4 to 8 hydroxyl groups, A is selected from the group consisting of alkyl of 1 to 10 carbon atoms, cycloalkyl of 5 to 6 carbon atoms, hydrocarbyl aryl of 6 to 18 carbon atoms, monohalophenyl, dihalophenyl, lower alkyl phenyl, lower alkyl naphthyl, phenyl-lower alkyl, hydroxy-lower alky, containing from 1 to 4 hydroxyls, hydroxy-lower alkoxy-lower alkyl, containing from 1 to 5 hydroxyls, lower alkylene, monochloro-lower alkylene, mononitro-lower alkylene, phenyl-lower alkylene, cyclohexyl-lower alkylene, dichloro-lower alkylene, and hydroxy-lower alkylene, containing up to 3 hydroxyls, alkoxyalkyl wherein the alkoxy and alkyl radicals are each of up to 10 carbon atoms, lower alkoxy cycloalkyl, wherein the cycloalkyl is of 5 to 6 carbon atoms, lower alkene, and cycloalkene, wherein the cyclic radical is of 5 to 6 carbon atoms, and $n$ is from 0 to 5.

2. An ester of phosphonic acid of the formula

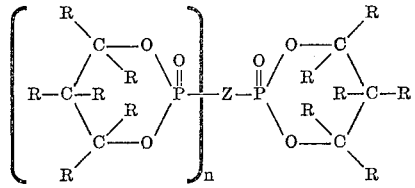

having from 4 to 54 carbon atoms and from 2 to 11 hydroxyls, wherein R is independently selected from the group consisting of hydrogen, alkyl of 1 to 10 carbon atoms, lower alkyl substituted phenyl, phenyl substituted-lower alkyl, nitro, chloromethyl, bromomethyl, iodomethyl, monohalophenyl, dihalophenyl, hydroxy-lower alkyl, containing from 1 to 4 hydroxyls, phenyl, alkoxyalkyl, wherein the alkoxy and alkyl radicals are each of up to ten carbon atoms, hydroxy-lower alkoxy-lower alkyl, containing from 1 to 5 hydroxyls, lower alkene, lower alkyl substituted lower alkene, monohalosubstituted alkene, Z is selected from the group consisting of alkyl of 1 to 10 carbon atoms, lower alkylene, lower alkene phenyl substituted lower alkyl, phenyl, lower alkyl substituted phenyl, monohalophenyl, dihalophenyl, hydroxyl substituted lower alkyl containing from 1 to 4 hydroxyls, hydroxyl substituted lower alkylene containing up to three hydroxyls, monohalosubstituted lower alkylene, monohydroxyl substituted phenyl, monohydroxy phenyl substituted lower alkyl, and monohydroxy-lower alkyl substituted phenyl, and $n$ is from 0 to 5.

3. An ester of phosphonic acid of the formula

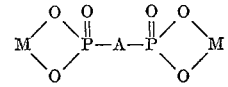

having from 4 to 54 carbon atoms and from 4 to 11 hydroxyls, wherein M is a residue of a polyol wherein two hydroxyls are removed from carbon atoms with hydroxyls attached thereto and with carbon atoms between the two carbon atoms from which the hydroxyl groups have been removed, said polyol being of 3 to 15 carbon atoms and having from 4 to 8 hydroxyl groups, and A is selected from the group consisting of alkyl of 1 to 10 carbon atoms, cycloalkyl of 5 to 6 carbon atoms, hydrocarbyl aryl of 6 to 18 carbon atoms, monohalophenyl, dihalophenyl, lower alkyl phenyl, lower alkyl naphthyl, phenyl-lower alkyl, hydroxy-lower alkyl, containing from 1 to 4 hydroxyls, hydroxy-lower alkoxy-lower alkyl, containing from 1 to 5 hydroxyls, lower alkylene, monochloro-lower alkylene, mononitro-lower alkylene, phenyl-lower alkylene, cyclohexyl-lower alkylene, dichloro-lower alkylene, and hydroxy-lower alkylene, containing up to three hydroxyls, alkoxyalkyl wherein the alkoxy and alkyl radicals are each of up to ten carbon atoms, lower alkoxy cycloalkyl, wherein the cycloalkyl is of 5 to 6 carbon atoms, lower alkene, and cycloalkene, wherein the cyclic radical is of 5 to 6 carbon atoms.

4. An ester of phosphonic acid having the formula

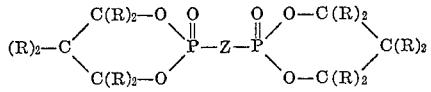

having from 6 to 54 carbon atoms and from 2 to 11 hydroxyls, wherein R is independently selected from the group consisting of hydrogen, alkyl of 1 to 10 carbon atoms, lower alkyl substituted phenyl, phenyl substituted-lower alkyl, nitro, chloromethyl, bromomethyl, iodomethyl, monohalophenyl, dihalophenyl, hydroxy-lower alkyl, containing from 1 to 4 hydroxyls, phenyl, alkoxyalkyl, wherein the alkoxy and alkyl radicals are each of up to ten carbon atoms, hydroxy-lower alkoxy-lower alkyl, containing from 1 to 5 hydroxyls, lower alkene, lower alkyl substituted lower alkene, monohalosubstituted alkene, and Z is selected from the group consisting of lower alkylene, hydroxyl substituted lower alkylene containing up to three hydroxyls, and monohalosubstituted lower alkylene.

5. An ester of phosphonic acid having the structure

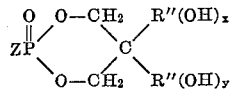

having from 5 to 54 carbon atoms and from 2 to 11 hydroxyls wherein Z is selected from the group consisting of alkyl of 1 to 10 carbon atoms, lower alkene, phenyl substituted lower alkyl, phenyl, lower alkyl substituted phenyl, monohalophenyl, dihalophenyl, hydroxyl substituted lower alkyl containing from 1 to 4 hydroxyls, substituted lower alkyl containing up to two hydroxyls and one nitro, monohydroxy phenyl substituted lower alkyl, monohydroxylower alkyl substituted phenyl, and R″ is selected from the group consisting of hydrogen, lower alkyl of 1 to 10 carbon atoms, lower alkene, nitro, halomethyl, phenyl-lower alkyl, and lower alkoxy-lower alkyl and the sum of $x$ and $y$ is an integer greater than 1.

6. An ester of phosphonic acid of the formula

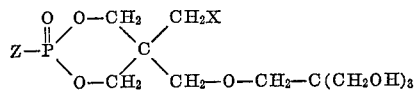

and

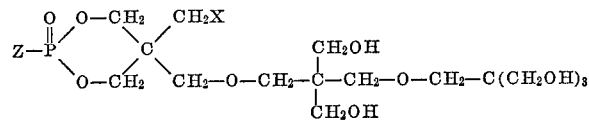

having from 10 to 54 carbon atoms and from 5 to 11 hydroxyls, wherein Z is selected from the group consisting of alkyl of 1 to 18 carbon atoms, lower alkene, phenyl substituted lower alkyl, phenyl, lower alkyl substituted phenyl, monohalophenyl, dihalophenyl, hydroxyl substituted lower alkyl, having from 1 to 4 hydroxyls, monohydroxy phenyl, monohydroxy phenyl-lower alkyl, and monohydroxy alkyl phenyl, and X is a halogen selected from the group consisting of chlorine, bromine and iodine.

7. Pentaerythritol butane phosphonate.
8. Bromodipentaerythritol decane phosphonate. phosphonate.
9. Chlorodipentaerythritol-5-methylene ethyl furfural phosphonate.
10. Chlorodipentaerythritol furfural phosphonate.
11. Bis-chloropentaerythritol xylene diphosphonate.

References Cited

UNITED STATES PATENTS

| | | | |
|---|---|---|---|
| 3,152,164 | 9/1964 | Oswald | 260—937 |
| 3,209,014 | 8/1965 | Hechenbleikner | 260—937 |
| 2,974,158 | 3/1961 | Lanham | 260—927 |

OTHER REFERENCES

Van Wazer: Phosphorus and its Compounds, Volume I, N.Y., Interscience Publishers, Inc., pp. 383–84 (1958).

ALEX MAZEL, Primary Examiner

B. I. DENTZ, Assistant Examiner

U.S. Cl. X.R.

106—15; 252—8.1; 260—2.5, 8.1, 45.8, 45.95, 75, 77.5, 234, 799, 800, 927, 937

PO-1050
(5/69)

UNITED STATES PATENT OFFICE
CERTIFICATE OF CORRECTION

Patent No. 3,511,857    Dated May 12, 1970

Inventor(s)  Charles F. Baranauckas et al.

It is certified that error appears in the above-identified patent and that said Letters Patent are hereby corrected as shown below:

Column 3, line 10, delete formula and insert

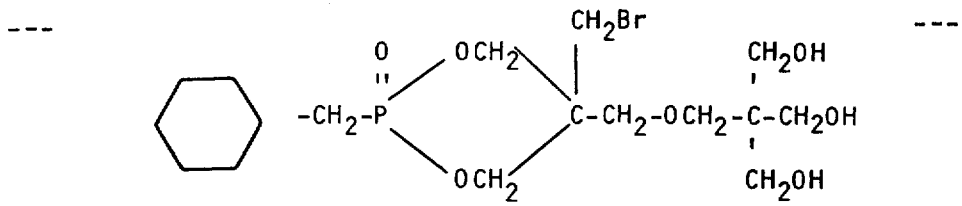

Column 4, line 5, delete "phospite" and insert --- phosphite ---.
Column 4, line 33, delete "7-dishydroxy" and insert --- 7-bishydroxy ---.
Column 5, last formula under Alkyl delete and insert

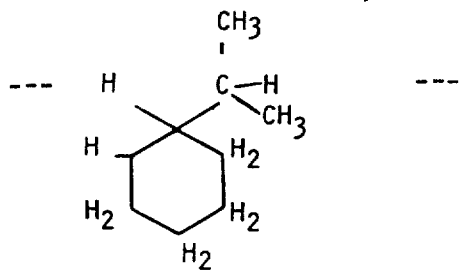

Column 10, line 56, delete " epibrimohydrin" and insert --- epibromohydrin ---.
Column 11, lines 2 and 6, delete "diepentaerythritol" and insert
    --- dipentaerythritol ---.
Column 11, line 20, delete "phosphinate" and insert --- phosphonate ---.

UNITED STATES PATENT OFFICE
CERTIFICATE OF CORRECTION

Patent No. 3,511,857  Dated May 12, 1970

Inventor(s) Charles F. Baranauckas et al.

It is certified that error appears in the above-identified patent and that said Letters Patent are hereby corrected as shown below:

Column 12, Formula 4, line 7, delete formula and insert

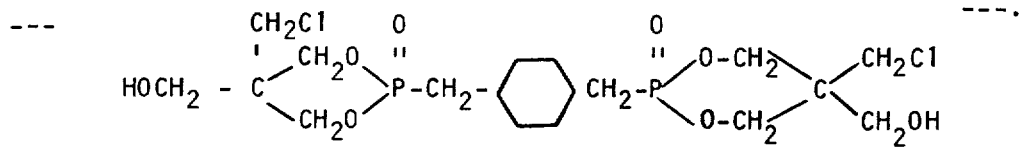

Column 17, line 13, delete "difluro" and insert --- difluoro ---.
Column 18, line 4, delete "pantae" and insert --- pentae- ---.
Column 20, line 6, delete formula and insert

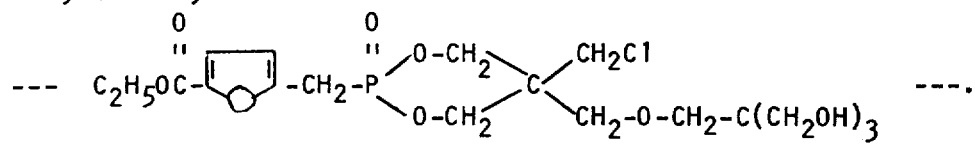

Column 21, Example 15, line 64, delete formula and insert

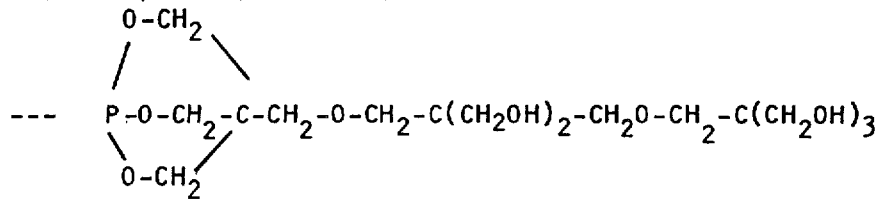

-2-

PO-1050
(5/69)

UNITED STATES PATENT OFFICE
CERTIFICATE OF CORRECTION

Patent No. 3,511,857         Dated May 12, 1970

Inventor(s) Charles F. Baranauckas et al.

It is certified that error appears in the above-identified patent and that said Letters Patent are hereby corrected as shown below:

Column 22, Example 19, line 55, delete formula and insert

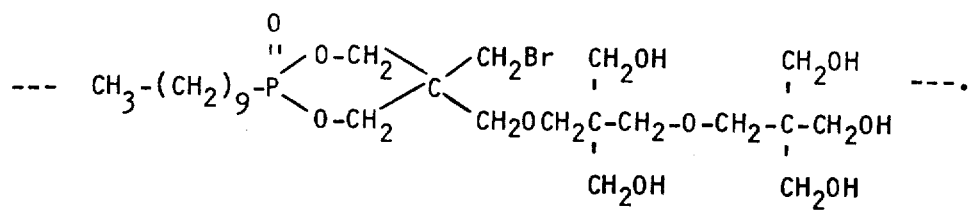

Column 23, Example 21, line 7, delete formula and insert

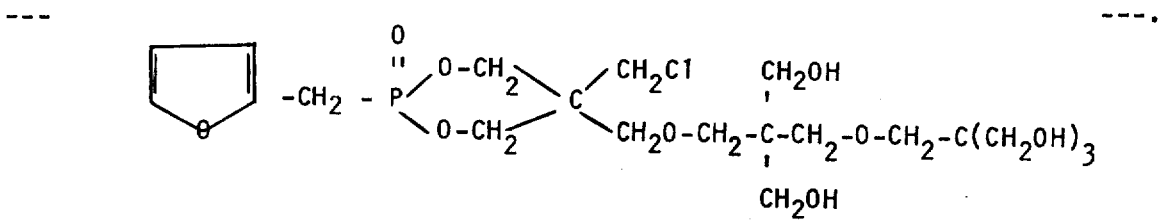

Column 23, Example 25, underneath formula, delete "Alkyl phosphinate".
Column 24, Example 26, line 3, delete formula and insert

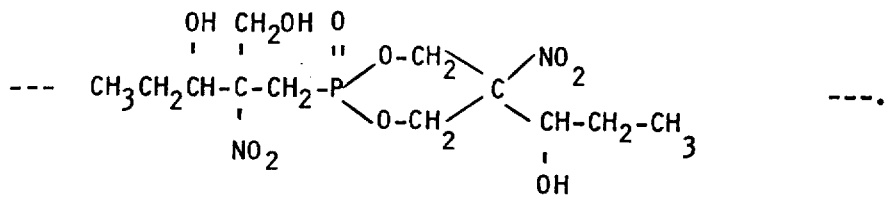

PO-1050
(5/69)

UNITED STATES PATENT OFFICE
CERTIFICATE OF CORRECTION

Patent No. 3,511,857      Dated May 12, 1970

Inventor(s) Charles F. Baranauckas et al.

It is certified that error appears in the above-identified patent and that said Letters Patent are hereby corrected as shown below:

Column 25, line 21, delete "mixted" and insert --- mixed ---.
Column 27, line 50 and 51, delete "Many modifications" and insert
    --- Many other modifications ---.
Column 27, Claim 1, line 70, delete "alky" and insert --- alkyl ---.
Column 29, Claim 6, line 33, delete "and" and insert --- or ---.

SIGNED AND
SEALED
DEC 15 1970

(SEAL)
Attest:

Edward M. Fletcher, Jr.
Attesting Officer

WILLIAM E. SCHUYLER, JR.
Commissioner of Patents